(12) United States Patent
Nguyen

(10) Patent No.: US 10,876,514 B2
(45) Date of Patent: Dec. 29, 2020

(54) OCEAN WAVE ENERGY EXPLOITING AND STORING DEVICE

(71) Applicant: Dinh Chinh Nguyen, Thai Binh (VN)

(72) Inventor: Dinh Chinh Nguyen, Thai Binh (VN)

( * ) Notice: Subject to any disclaimer, the term of this patent is extended or adjusted under 35 U.S.C. 154(b) by 0 days.

(21) Appl. No.: 16/159,712

(22) Filed: Oct. 15, 2018

(65) Prior Publication Data

US 2019/0113018 A1  Apr. 18, 2019

(30) Foreign Application Priority Data

Oct. 17, 2017 (VN) ................ 1-2017-04101

(51) Int. Cl.
*F03B 13/18* (2006.01)

(52) U.S. Cl.
CPC ...... *F03B 13/1845* (2013.01); *F03B 13/1815* (2013.01); *F05B 2240/40* (2013.01); *F05B 2240/91* (2013.01); *F05B 2240/915* (2013.01); *F05B 2240/95* (2013.01); *F05B 2260/406* (2013.01)

(58) Field of Classification Search
CPC .............. F03B 13/1845; F03B 13/1815; F05B 2240/40; F05B 2240/91; F05B 2240/915; F05B 2240/95; F05B 2260/406
See application file for complete search history.

(56) References Cited

U.S. PATENT DOCUMENTS

| | | | | |
|---|---|---|---|---|
| 3,912,938 A * | 10/1975 | Filipenco | ............... | F03B 13/183 290/53 |
| 4,363,213 A * | 12/1982 | Paleologos | ......... | F03B 13/1855 290/53 |
| 4,408,455 A * | 10/1983 | Montgomery | ...... | F03B 13/1815 60/497 |
| 4,480,966 A * | 11/1984 | Smith | ................. | F03B 13/1815 417/332 |
| 5,154,561 A * | 10/1992 | Lee | ......................... | B63B 27/12 114/264 |
| 5,426,332 A * | 6/1995 | Ullman | .................... | F03B 13/26 290/4 D |
| 6,930,406 B2 * | 8/2005 | Montgomery | ...... | F03B 13/1845 290/42 |
| 7,808,120 B2 * | 10/2010 | Smith | ................. | F03B 13/1815 290/42 |
| 7,956,479 B1 * | 6/2011 | Bergman | ............... | F03B 13/187 290/53 |
| 10,415,539 B1 * | 9/2019 | Osterman | ............. | F03B 13/262 |
| 10,436,171 B2 * | 10/2019 | Crouch | ................... | F03B 13/06 |

(Continued)

*Primary Examiner* — Tulsidas C Patel
*Assistant Examiner* — Joseph Ortega

(57) ABSTRACT

The present invention related to the ocean wave energy exploiting and storing device for electricity generation. The device consists of one hollow pillar (1), the pillar has a base to install the platform (3) and a slot for the hydraulic cylinder (2). The weight-loaded type accumulator (4) is installed within the pillar; two work platform (3) and (13) installed separately which work independently on each other. The first platform (3) covers the head of the pillar above the seal level and can move up and down. The level arm (6) is equipped with the hydraulic cylinder (9 via a swivel join (10). There is a buoy (12) installed on the other end of the level arm. The second platform (13) is placed on the head of the pressing axle (5) above the first one (3).

1 Claim, 3 Drawing Sheets

(56) References Cited

U.S. PATENT DOCUMENTS

| | | | |
|---|---|---|---|
| 2003/0024247 A1* | 2/2003 | Henke | F03B 13/1815 60/641.8 |
| 2006/0202483 A1* | 9/2006 | Gonzalez | F03B 13/1845 290/53 |
| 2007/0102937 A1* | 5/2007 | Resen Steenstrup | F03B 11/06 290/53 |
| 2008/0018114 A1* | 1/2008 | Weldon | F03B 13/181 290/53 |
| 2008/0122225 A1* | 5/2008 | Smith | F03B 13/1815 290/42 |
| 2009/0008941 A1* | 1/2009 | Irti | F03B 13/24 290/53 |
| 2010/0043425 A1* | 2/2010 | Dragic | F03B 13/189 60/504 |
| 2010/0148510 A1* | 6/2010 | Larivan | F03B 13/1845 290/53 |
| 2010/0219640 A1* | 9/2010 | Gracia Lopez | F03B 13/1815 290/53 |
| 2011/0074160 A1* | 3/2011 | Chua | F03B 13/187 290/53 |
| 2011/0121572 A1* | 5/2011 | Levchets | F03B 13/20 290/53 |
| 2011/0304144 A1* | 12/2011 | Dehlsen | E02B 9/08 290/53 |
| 2012/0001431 A1* | 1/2012 | Smith | E02B 17/0004 290/53 |
| 2014/0042744 A1* | 2/2014 | Daya | F03B 17/02 290/42 |
| 2014/0090854 A1* | 4/2014 | Robichaux | E21B 33/06 166/351 |
| 2014/0305118 A1* | 10/2014 | Tai | F03D 9/28 60/497 |
| 2014/0327338 A1* | 11/2014 | Vamvas | H02N 11/002 310/306 |
| 2014/0338321 A1* | 11/2014 | You | F03B 13/189 60/496 |
| 2016/0083920 A1* | 3/2016 | Siltala | F03B 13/16 60/499 |
| 2017/0101977 A1* | 4/2017 | Sidenmark | F03B 13/186 |
| 2017/0184071 A1* | 6/2017 | Androsiuk | F03B 13/1875 |
| 2018/0058419 A1* | 3/2018 | Liao | F03B 13/1815 |
| 2018/0128237 A1* | 5/2018 | Laracuente-Rodriguez | F03B 15/00 |
| 2018/0258904 A1* | 9/2018 | Gorman | F03B 13/187 |
| 2019/0161146 A1* | 5/2019 | Hellesmark | B63B 27/24 |
| 2019/0234370 A1* | 8/2019 | Weinberg | F03B 13/1875 |

* cited by examiner

OCEAN WAVE ENERGY EXPLOITING AND STORING DEVICE

FIELD OF THE INVENTION

The present invention relates to the ocean wave energy exploiting and storing device.

BACKGROUND OF THE INVENTION

It is now possible to exploit energy from ocean waves for electricity generation by floating buoy which is a device with buoy-attached lever arm and there are hydraulic cylinders attached to lever arm for oil pumping or floating buoy is attached to the axle head of hydraulic cylinders. Ocean waves will lift the buoy up and down to pump oil to an accumulator pressed by pressure generating gas to provide energy directly for the turbine or the hydraulic motor. The hydraulic motor provides energy for the turbine to generate electricity by rotation, or for the hydraulic cylinders' for its pulling and pushing movement upon the equipment clusters which are equipped with permanent magnets to generate electricity through oscillation.

The weaknesses of current devices include incapacity of energy storage, low level of generated pressure and low stability, which lead to low efficiency in electricity generation.

SUMMARY OF THE INVENTION

Therefore, the purpose of the present invention is to improve the exploitation efficiency to store energy for electricity generation when there is no wave.

To achieve the above-mentioned purpose, the ocean wave energy exploiting device has been invented as follows:

The hollow pillar of the device is installed on the sea bed with the head emerging out of the water. The pillar is equipped with two work platforms of which one is installed with buoys and oil-pumping hydraulic cylinders and the other with oil tanks, hydraulic motors, turbines, electric distribution boards and other relevant equipment. The distinguished feature of the device is that on the outer side of the pillar, there are slots to install platform-lifting hydraulic cylinders and a base to support the platform. The hollow section of the pillar is the position to install the weight-loaded type accumulator. The two separated platforms installed to the pillar work independently.

Since the accumulator is installed within the pillar, the capacity of the accumulator is enhanced and the weight of the second work platform affects the axle head of the accumulator. Due to the weight of the second platform and major equipment on the axle head of the accumulator, the pressure therein is always stabilized at a high level.

BRIEF DESCRIPTION OF DRAWINGS

FIG. 1
Includes the assemblies noted as follows:

1-Pillar
2-Hydraulic cylinder
3-First platform with lever arms

Figure 1:
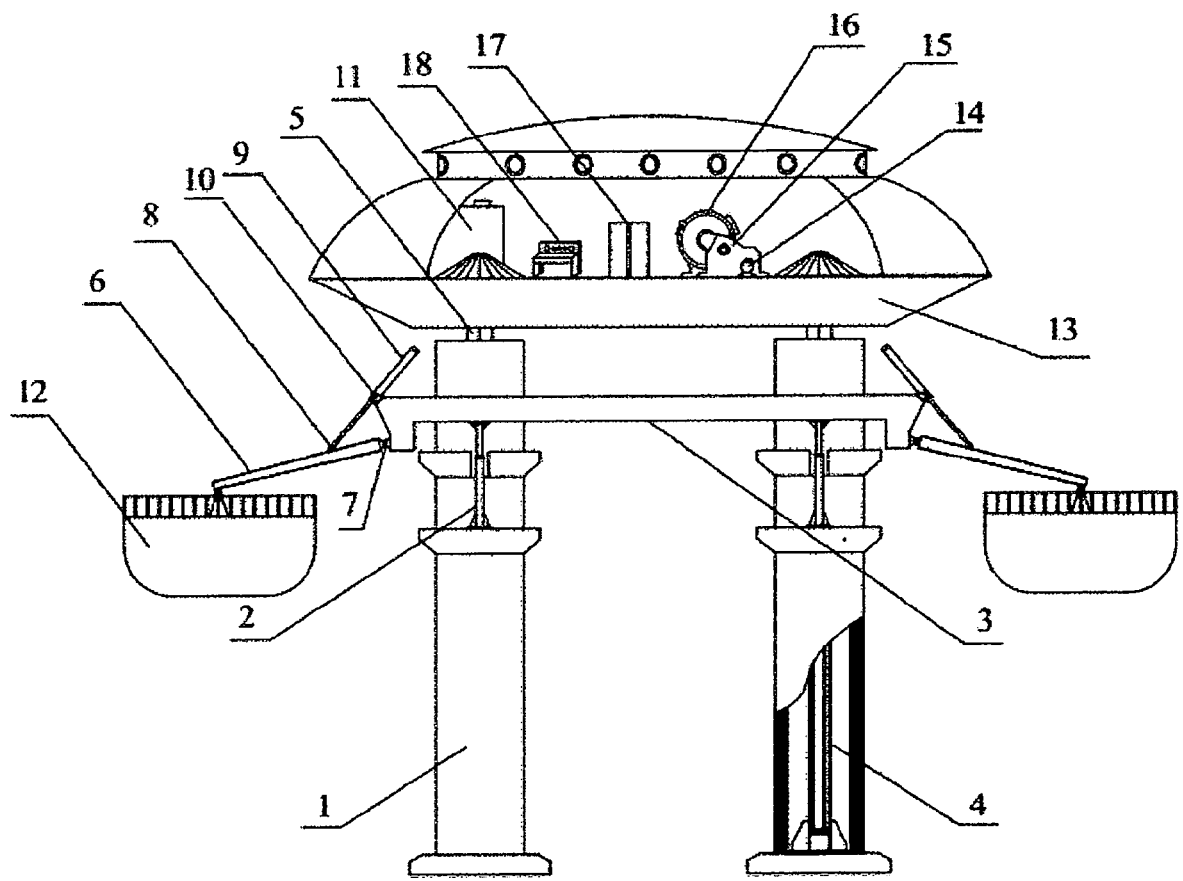
FIG. 1 illustrates the ocean wave energy exploiting and storing device in the invention.
Figure 2:
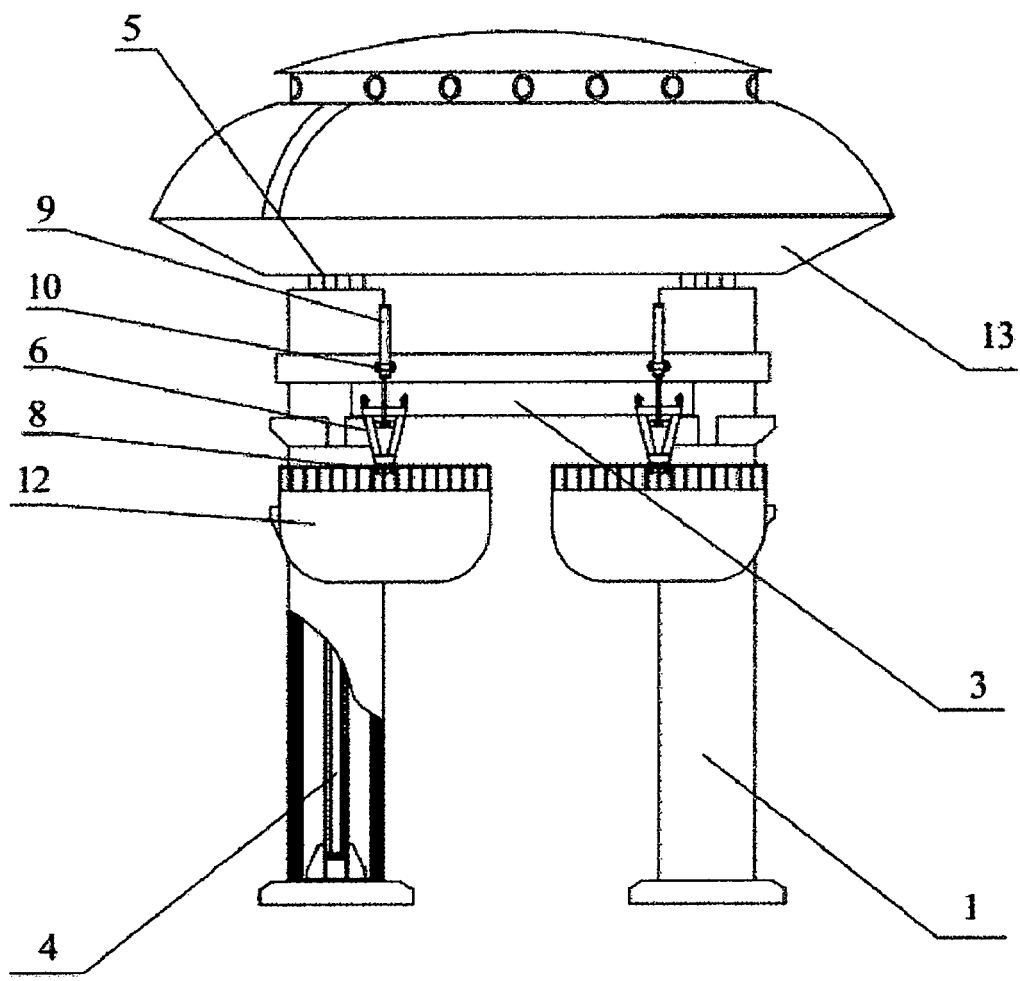
FIG. 2 and FIG. 3 are the projections of FIG. 1.
Figure 3:
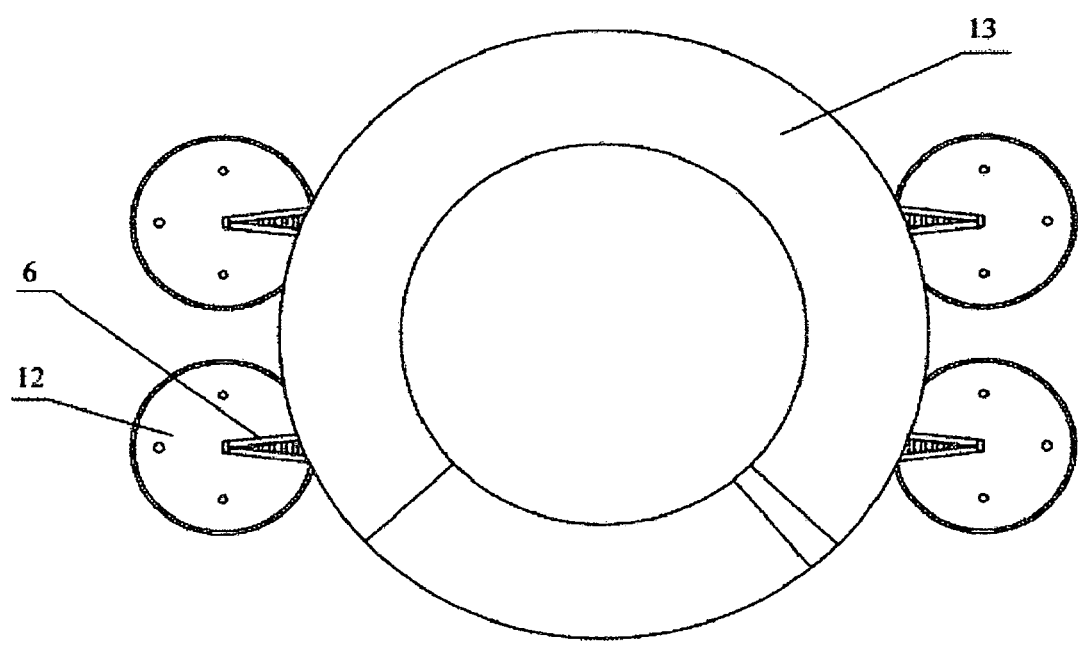

FIG. 1
Includes the assemblies noted as follows:

4-Accumulator
5-Axle of accumulator
6-Lever arm
7-Swivel joint of lever arm
8-Swivel joint of cylinder
9-Hydraulic cylinder (oil)
10-Swivel joint connecting the cylinder to the platform
11-Oil tank
12-Buoy
13-Second platform with equipment units
14-Hydraulic motor
15-Acceleration box
16-Turbine
17-Electric distribution board
18-Control center

DETAILED DESCRIPTION OF THE INVENTION

As illustrated in FIG. 1, the ocean wave energy exploiting and storing device includes: At least one hollow pillar (1) installed on the ocean bed with the head emerging out of the sea water. The outer surface of the pillar is made of salt resistant material with slots to install hydraulic cylinders (2) to lift the first platform (3) and a base to support the first platform (3). The pillar is also the cover for a weight-loaded type accumulator. This high volume accumulator (4) is installed inside the pillar. The center axle of the accumulator is higher than the pillar head to install the second platform. This second floor always weight on the axle head of the accumulator to press the oil for pressure. The pillar is not only used to support the work platforms but also the location to install the high volume accumulator.

The first platform (3) cover the pillar head above the sea level and can move up and down thanks to the operation of the hydraulic cylinder (2). The cylinder (2) is energized from the accumulator (4) via a pipe, the control valve raise and fall by the tidal cycles. There is at least one lever arm cluster (6) with one end attached to the first platform via a swivel joint (7). On the lever arm, there is another swivel joint (8) to connect it with one end of the hydraulic cylinder (9). The hydraulic cylinder (9), at the other end, is connected to the platform (3), also through a swivel joint (10). The oil provided for the hydraulic cylinder (9) is from the oil tank (11) via a pipeline with check valve. The lever arm (6) is equipped with a buoy (12) on the other end. Ocean waves lift the buoy (12) up and down, pushing the lever arm (6) to make the hydraulic cylinder (9) work and pump oil into the accumulator (4) via a pipeline and a check valve.

The second platform (13) is placed on the head of the pressing axle (5) of the accumulator (4) above the first one (3). The distance between the two platform provides enough space for the first platform (3) to move up and down, as controlled by the hydraulic cylinder (2) with tidal movement.

When the buoy (12) moves up and down with the ocean wave and push the lever arm (6), forcing the hydraulic cylinder (9) to pump oil to the accumulator (4) via the pipe line and the check valve, the second platform (13) will be lifted upward by the axle (5) of the accumulator (4). The weight of the second platform (13) always press onto the axle of (5) of the accumulator (4) to create a stable pressure. The oil flow with high pressure in the accumulator (4) generate power and transfer it to the hydraulic cylinders (2)

and (9) and the hydraulic motor (14) via the control valves and the pipelines. The hydraulic motor (14) then rotate the acceleration box (15) to energize the turbine (16) to generate electricity. The high pressure oil provided for the cylinders (2) and (9) and the hydraulic motor (14) from the accumulator (4) will then be returned to the oil tank (11) where it is processed and cooled before being transferred to the cylinder (9) again to start a new cycle. With the weight of the second floor loading on the axle (5) of the accumulator (4), a high stable pressure will be created as a huge source of instant energy for the effective operation of the turbine (16). Because of the high capacity and the high pressure of the accumulator (4), the energy reserved in it is still sufficient for the hydraulic cylinders, the hydraulic motor and the turbine to generate electricity.

The second platform is installed (leaning against) axle heads of cylinders inside the hollow pillars (oil-containing cylinders), thus weight of the second platform (of thousands of tons) always pushes down on the cylinders (potential energy). The oil is pushed into the accumulator by the pumps installed on the buoy rod under the up-and-down movement of the sea waves, lifting the second platform up thanks to the oil contained within the accumulator (pumps on the buoy rod are similar to small hydraulic jacks that can lift up tens-of-tons vehicles). The second platform with high weight always forces onto the cylinder's axle head of the accumulator, thus creating high and stabilized pressure when the oil is extracted and transmitted to the hydraulic motor. This is the most outstanding advantage of the weight-based accumulator.

The accumulators in pillars are the source of the energy provided directly for the hydraulic cylinders, the acceleration box and the operation of the turbine. Additionally, the accumulator is purposely used as a reservoir in case pumps pushes an excess of oil for motor operation, leading to the oil surplus being pushed into the accumulator. For example, each accumulator can contain 10 m3 reserve oil, which is possible to provide an oil supply enough for motor to operate in 1-n hours according to the allowed design factors. This operation time is called energy reserve such as battery.

The accumulator is designed to have a check valve playing the role of the input valve for the pump, another check valve to open a gate to transport oil to the motor. Normally, the gate close to the bottom of the accumulator is opened to make full use of the reserve oil.

The oil inside the accumulator, which is provided by the pumps on the buoy rods under the influence of the platform weight, is calculated to create a desirable pressure. For example, to reach a pressure of 350 bar and the flow discharge of 600 liters per minute, the pump needs to have higher capacity to supply enough oil and gradually reduce oil reserve. The oil flow with high pressure is transmitted from the accumulator to hydraulic motor via a check valve and pipeline with suitable loading capacity.

Hydraulic motor, acceleration box and turbine are independent devices which are broadly manufactured and available in the market, we only need to have them integrate with each other and supply energy for their operation. This also applies to switchgears and their accessories. The pressure is always high and stabilized thanks to the operation of accumulator based on platform weight, wherein the platform weight is unchanged, leading to a stabilized pressured.

There are 2 cheek valves, one in and one out, on the accumulator. The oil transmitted to the motor is one in and one out, as well. The oil out of the motor is discharged to the reserve oil tank, which is oil supply for pumps on the buoy rods, which in turns pushed to the accumulator. Apart from the check valves, there are other skill-in-the-art accessories to adjust pressure discharge.

The oil supply for the hydraulic cylinder that pushes the platform 1 up and down following the tide is extracted from the pumps via change valve, which can be automatically installed or manually controlled by workers.

All equipment that exploits sea wave using hydraulic method in the world has not achieved high capacity due to pressure and discharge are under expectation. Moreover, use of other pressure accumulators is not as effective as the aforementioned weight-based accumulator

I claim:
1. An ocean wave energy exploiting and storing device comprising:
    at least one hollow pillar (1) with a base installed on seabed and a head above sea level, on outer side of the pillar (1), the hollow pillar comprising a slot to install a hydraulic cylinder (2) to lift a first platform (3) and a base to support that platform (3), a weight-loaded type accumulator (4) installed in the hollow of the pillar, the accumulator (4) has a center axle (5) higher than the pillar head (1) to install a second platform (13) always-forcing on the axle (5) of the accumulator (4), the pillar (1) supports the work platform (3) and is the place to install the accumulator (4), which is the source of the energy provided directly for the hydraulic cylinders to operate the turbine for electricity generation;
    two work platforms (3) and (13) which are installed separately and work independently, wherein:
        the first platform (3) covers the head of the pillar (1) above the sea level and can move up and down with the tide thanks to the operation of the hydraulic cylinder (2), the cylinder (2) is energized by the accumulator (4), there is at least one cluster of lever arm (6) with a swivel joint (7) to connect to the first platform (3), on the lever arm, there is another swivel joint (8) to connect it with one end of the hydraulic cylinder (9), the hydraulic cylinder (9), at the other end, is connected to the platform (3), also through a swivel joint (10), the oil provided for the hydraulic cylinder (9) is from the oil tank (11), the lever arm (6) is equipped with a buoy (12) on the other end, ocean waves lift the buoy (12) up and down, pushing the lever arm (6) to make the hydraulic cylinder (9) work and pump oil into the accumulator (4);
        the second platform (13) is placed on the head of the pressing axle (5) of the accumulator (4) above the first platform (3), the distance between the two platforms provides enough space for the first platform (3) to move up and down, as controlled by the hydraulic cylinder (2) with tidal movement, this second platform (13) has a high level of weight and always forces onto the axle head (5) of the accumulator (4).

* * * * *